Nov. 28, 1944.   C. W. RICE   2,363,622
METHOD OF AND APPARATUS FOR TREATING BOILER WATER
Filed June 10, 1942   3 Sheets-Sheet 1
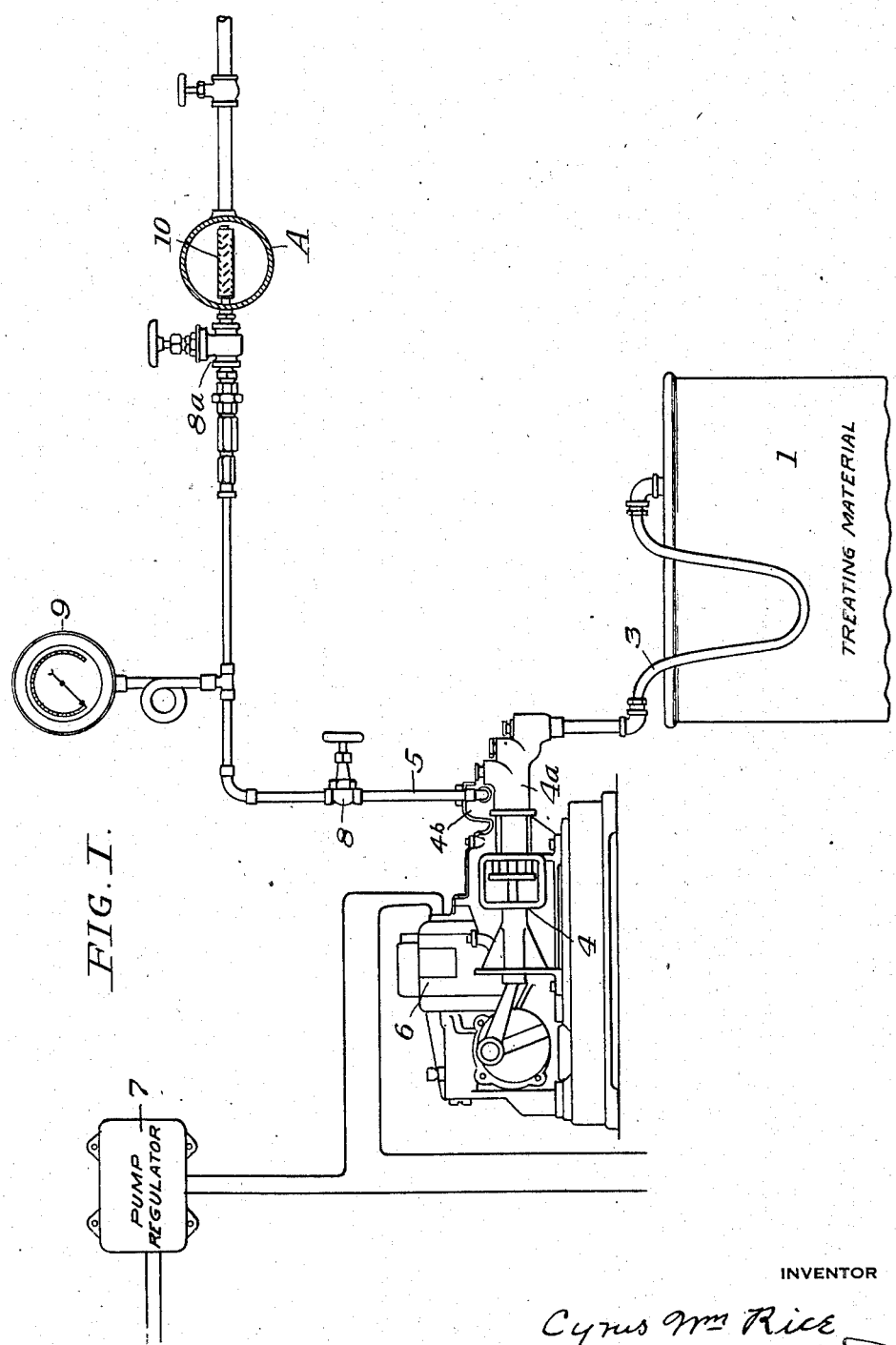
FIG. I.
INVENTOR
Cyrus Wm Rice
by William B. Wharton
his attorney

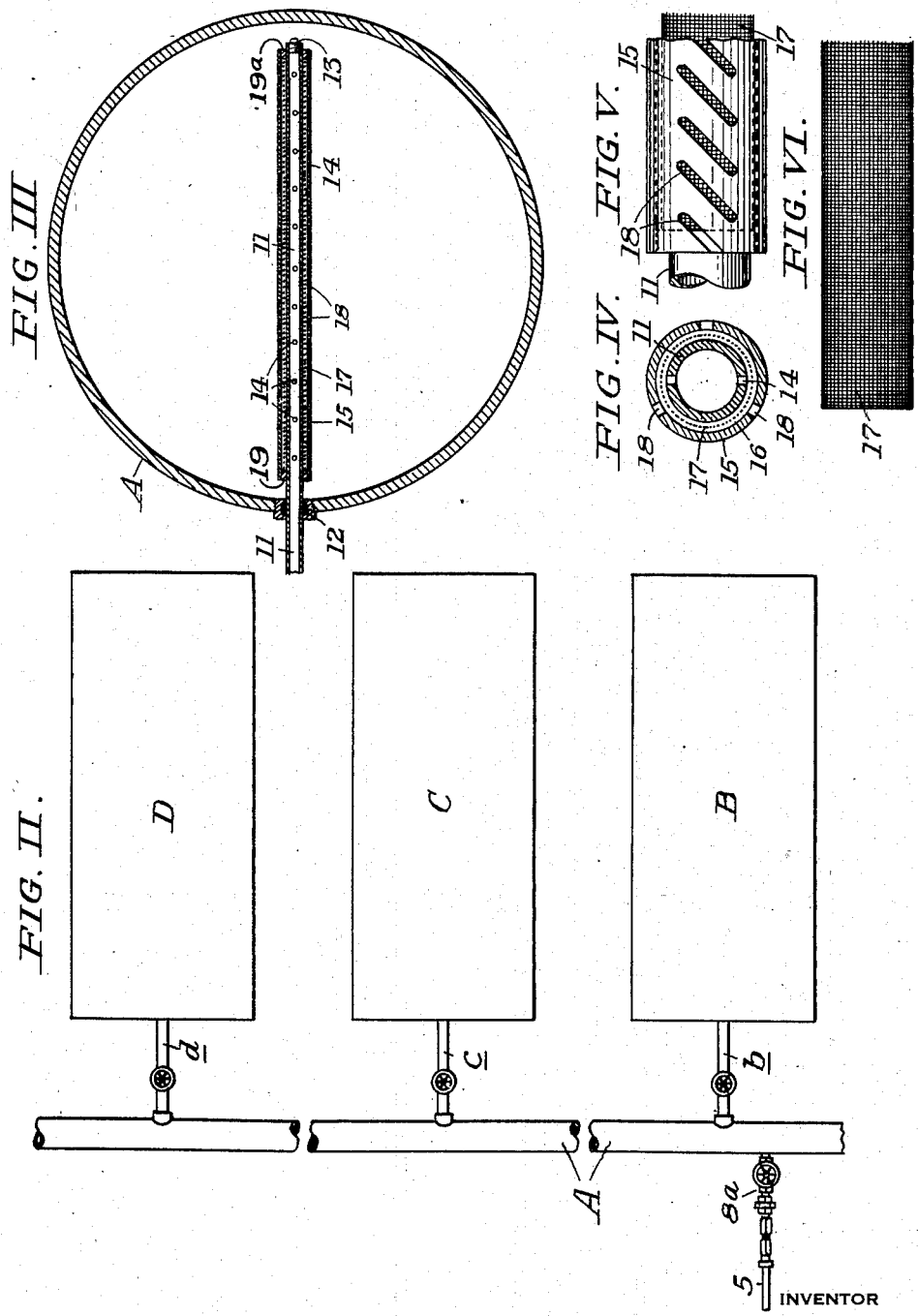

Nov. 28, 1944.　　　C. W. RICE　　　2,363,622
METHOD OF AND APPARATUS FOR TREATING BOILER WATER
Filed June 10, 1942　　　3 Sheets-Sheet 3
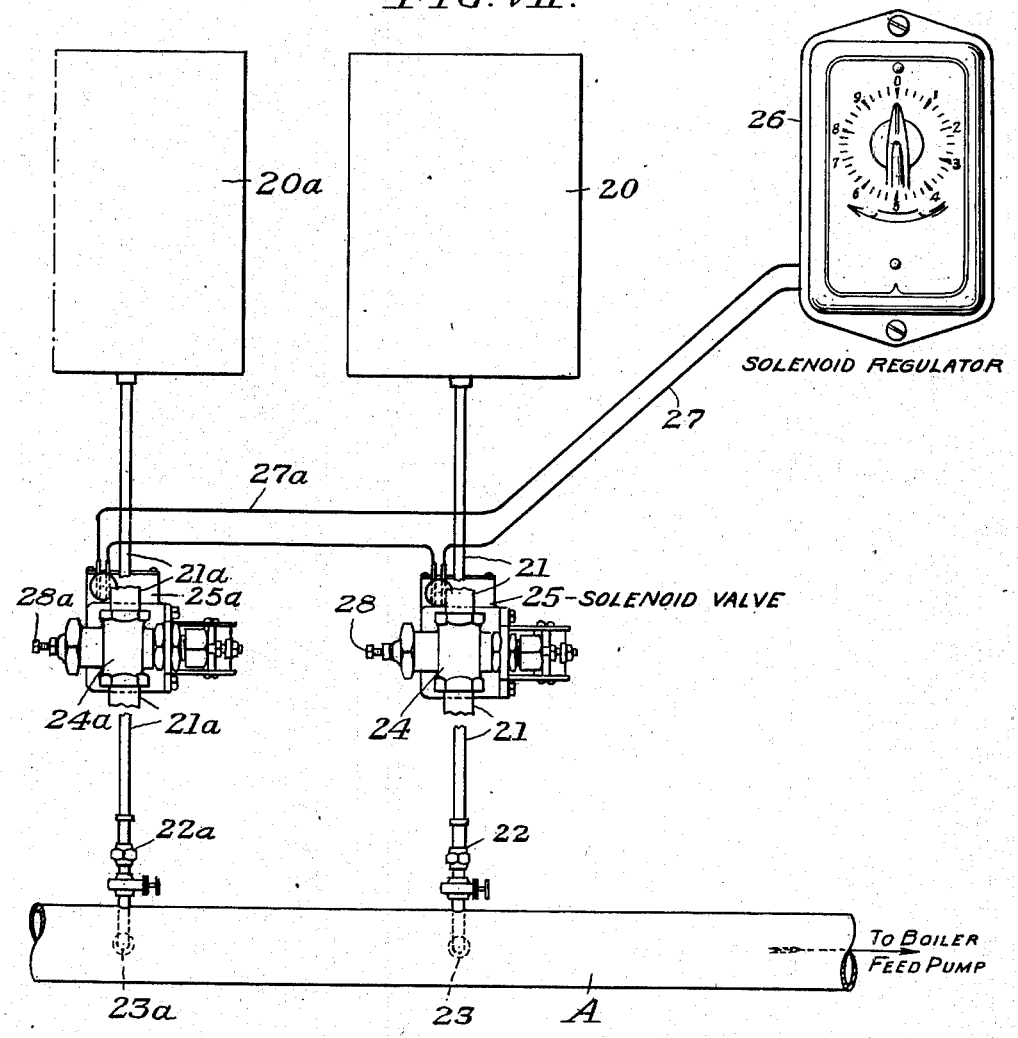

Patented Nov. 28, 1944

2,363,622

UNITED STATES PATENT OFFICE 2,363,622

METHOD OF AND APPARATUS FOR TREATING BOILER WATER

Cyrus W. Rice, Pittsburgh, Pa.

Application June 10, 1942, Serial No. 446,428

7 Claims. (Cl. 210—29)

This invention relates to a method of and apparatus for treating boiler water.

An object of my invention is to provide a method by which a treating composition for boiler water in the form of a solution or suspension of the material may be supplied to boiler feed water, or to boilers, gradually over substantially extended and relatively spaced periods of supply; thus increasing the effectiveness of any given quantity of the treating material, and economizing in the total quantity of material required to maintain boiler water conditions favorable for preventing scale formation in the boiler.

Another object of my invention, desirably as hereinafter shown operatively combined with the gradual supply of treating material during relatively spaced periods, is the automatic regulation of the recurrence and duration of the supply periods.

In past practice boiler-treating compounds have been supplied wastefully to boiler water and to boilers. It is possible to calculate the theoretical quantities of various boiler-treating materials and compounds which should be carried in a boiler on the basis of the composition of the boiler water and boiler concentrates. Such calculations are of no substantial value, however, if the boiler-treating material is introduced in "slugs" in accordance with the prior practice; because it is in such case necessary to introduce large excess of the treating material in order to compensate for exhaustion of the material in the intervals between "slug" introductions, and to make up for the relative inefficiency of the material resulting from its imperfect distribution in the water.

Generally described, my method consists in supplying the treating material at spaced time intervals, and in apportioned quantity to a boiler, or to a battery of boilers, under such conditions that it is picked up finely dispersed in the flowing feed water. The water-treating material so used in apportioned supply and gradual delivery desirably is a protein peptized to a condition for reaction with an alkaline reagent, or with boiler water alkalinity, primarily by reaction with a suitable acid such as phosphoric and lactic acids. Such material provides in the boiler a protective colloid tending to maintain precipitated solids in suspension, as well as reacting with calcium and magnesium in the boiler water. The composition and effect of boiler-treating compounds of this sort are described in United States Patent No. 2,271,499, issued to me January 27, 1942; and such material may here be taken as exemplary of boiler treating compounds which are susceptible of introduction into boiler water in the form of a viscous or pasty solution or suspension. It is clearly to be understood, however that my present invention is not limited to a boiler-treating material, or class of materials, of any particular chemical constitution.

An apparatus organization exemplary of those which may be used in practicing the method of my invention is shown in the accompanying drawings, in which:

Fig. I is a schematic elevational view showing an apparatus arrangement by which boiler-treating material is taken automatically in apportioned amounts at uniformly spaced time intervals of equal length from a source of supply, and is delivered to and detained in such relation to a flowing stream of water passing to a boiler, or bank of boilers, that it is taken up in distributed condition by and in the boiler feed water, for delivery to the boiler in fine and approximately uniform dispersion.

Fig. II is a diagrammatic plan view of a bank of boilers having branch connections to a common conduit or header in to which boiler-treating material may be introduced in accordance with my novel method.

Fig. III is a view on a scale larger than that of Fig. I showing a conduit for a flowing stream of boiler feed water, and distributor organized to produce an intimate and approximately uniform dispersion for boiler-treating material therein.

Fig. IV is a cross-sectional view, taken on a further enlarged scale, through the distributor element of the apparatus organization illustrated.

Fig. V is an elevational view of the said distributor element.

Fig. VI is an elevational view of a tubular screen cloth forming part of the said distributor element.

Fig. VII is a schematic elevational view, similar in its presentation to Fig. I. This figure of the drawings shows a modified embodiment of apparatus means for conducting the method of my invention.

Describing the apparatus organization shown as exemplary with particular attention to Fig. I of the drawings, reference numeral 1 designates a tank or drum containing boiler-treating material of suitable sort. From this container of the boiler-treating material in bulk supply, a line 3 leads to the inlet end 4a of a pump 4, and a discharge line 5 leads from the outlet end 4b of the pump. Pump 4 is actuated by a motor 6, which operates under the control of an electrical regulator indicated at 7. This electrical regulator may be any of the many well-known commercial devices set to energize electrical motors during adjustably spaced time periods of definite duration. Whereas the usual adjustments of the pump 4 give regulation in the rate at which material is delivered, the electrical regulator gives a timed regulation for its delivery.

Discharge line 5 is provided with a valve 8 and pressure gauge 9, and is equipped with a valved distributor-replacement unit 8a through which it communicates with a conduit A forming a delivery line for a flowing stream of boiler feed water. At the end of the delivery line 5 from pump 4, and within the bore of conduit A, there is a distributor element 10 which is constructed to make gradual distributed delivery of the treating material to the stream of feed water in conduit A.

The distributor 10 is shown in detail in Figs. III to VI inclusive of the drawings. The distributor structure includes a rigid tube 11 which also forms part of the distributor-replacement unit 8a. This rigid tube 11 is sealed in the wall of conduit A by packing gland 12, and is closed at its end by a plug 13. The rigid tubular portion 11 of the delivery line which lies within conduit A is perforate, and is pierced by a plurality of holes 14. Surrounding tube 11 there is a second tubular member 15, which may be flanged at its ends, or separate rings 19—19a may be employed to have close contact with the outer wall of tube 11 and providing an annular space 16 between it and the outer surface of tube 11. In this space there lies a tubular comminuting element 17 of screen cloth. Through the wall of the outer tube 15 there are a plurality of hack-saw cuts 18. The size of the openings through the walls of the tubes and the mesh of the screen may be varied, because it is necessary only that they be of such size and so arranged that the treating material be delivered in a condition so fine that it is thoroughly broken up and finely dispersed in the stream of feed water during the periods in which it is supplied. For delivering a viscous material, such as the reacted protein material noted above, I have found that I may make the perforations 14 in the inner tube 11 of a diameter as small as $\frac{1}{16}$ inch and may use screen cloth as fine as 100 mesh, if a substantial pump pressure be employed. As a general consideration it may be said that it is desirable in delivering the treating material to the feed water that it be as finely divided as practical considerations permit.

To describe the conduct of my method, initially it is to be understood that the feed water flows continuously, so that there is continual washing of the distributor element 10 by the stream of feed water passing to the boiler, or boilers, which it feeds. In Fig. II of the drawings, conduit A is shown as a header from which feed water passes by way of branch lines $b$, $c$, and $d$ to boilers B, C, and D. Valved delivery line 5 is shown as entering conduit A at a point to supply treating material to all the boilers of the bank.

With reference, as has become standard practice, to the hardness characteristics of the boiler water and the character of the treatment, it is decided what concentration of the treating material should be maintained in the boiler. With reference to this the delivery rate of the pump is regulated, and the electrical regulator is set to energize the pump motor for delivery periods of such length and recurrent at such intervals that boiler requirements are satisfied. This satisfaction, as has been above noted, is obtainable when practicing my method with a much smaller quantity per day of treating material than is effective when the material is delivered in accordance with prior practice, in "slugs" and without accurate timing.

To give a typical example of procedure in accordance with the method of my invention, the electrical regulator is set appropriately to control the energization of the pump motor and the operation of the pump; so that, for example, the pump will force the treating material from supply container 1 to the distributor 10 for 5 minutes in each hour. In such operation the treating material is forced through holes 14 in the inner tube 11 of the distributor, and through screen-tube 17 in the space 16. Feed water passes in and out of the space 16 through saw-cuts 18, and washes out treating material of viscous nature which has been forced through the meshes of tubular screen 17. As this washing action continues during a relatively long period, the treating material is thoroughly distributed in the feed water and is carried into the boiler in a condition favorable to its further distribution in the water already therein. Under the control of the electrical regulator this slow distributed supply of the treating material is automatically repeated during periods of uniform length and uniform spacing during the entire campaign of the boiler, unless changed conditions in the feed water or in the boiler render readjustment of the supply necessary or desirable. Such readjustment may be effected conveniently by alteration in the length of time during which treating material is supplied to the feed water.

It may be explained that if the treating material is pumped or poured freely into the feed water, in accordance with prior practice, the treating material in such case is not dispersed in a large volume of the boiler feed water, and if it be viscous is not initially delivered to it in a physically divided condition. Much of the effectiveness of the treating material, and this is particularly true of viscous colloid-forming treating materials, is lost because of failure properly to distribute it in the boiler water, and boiler requirements for avoiding scale formation therein are greatly increased.

Attention has been called to the fact that the method of my invention, and also the apparatus embodiment thereof, are particularly useful in supplying viscous water-treating materials to a boiler in finely dispersed condition. This is for the reason that material of that sort is more difficult to distribute in the boiler water than are the non-viscous water solutions of inorganic treating materials. Solutions of that latter sort are, however, fed with advantage by my method of time-controlled delivery and fine distribution. The modification of Fig. VII, now to be described, shows as an incidental feature of its organization a duplication of structure for supplying an inorganic material in water solution. It is to be understood that an analogous duplication may be made in the apparatus showing of Fig. I, or the method and apparatus of my invention may be used solely to supply to the boiler non-viscous solutions of treating materials.

The apparatus shown in Fig. VII of the drawings is arranged to use the pressure of a gravity head, in place of pump pressure, to force the treating material into the boiler feed water in distributed condition. It includes a drum or tank 20 mounted at a substantially higher level than the feed-water conduit A to which water-treating material is supplied. A supply line 21 for treating material leads to the distributor-replacement unit 22, which carries distributor 23 lying within feed-water conduit A. Supply line 21 passes through valve 24, controlled by solenoid 25. Solenoid-controlled valves of this sort are well-known articles of commerce and may be of the type shown in the patent to Butzler 1,934,-791 or as shown in the patent to Waugh 2,021,248. The solenoid 25 controlling valve 24 itself acts under the control or influence of electric regulator 26, which communicates with solenoid 25 by circuit 27, to regulate the duration and recurrence of the periods during which the valve remains open under the control of its associated solenoid. Such regulators as well known and one type thereof is shown in the patent to Waugh 2,021,248. An adjusting screw 28 is usable to determine the extent to which valve 24 is opened by solenoid 25, thus giving accurate determination of the quantity of treating material delivered from the drum or tank 20 during each of the recurrent supply periods.

This modified organization is thus the full equivalent of the apparatus organization of Fig. I, and serves equivalently in performing the method of my invention. The pressure head is merely produced by gravity instead of pump action, and the electrical timing is effective on a valve controlling the flow of material under the pressure head rather than on a pump creating it.

If, as is my usual practice, the drum or tank 20 contains an acid-reacted protein, it is desirable similarly to supply to the feed-water conduit a water solution of an alkaline reagent, such as caustic soda, to react with the proteinate initially delivered to the feed water. For this purpose Fig. VII shows a partial duplication of the apparatus already described, comprising a tank or drum 20a for the alkaline solution, and a valve 24a under control of a solenoid 25a in the line 21a leading from the tank to a distributor replacement unit 22a, and a distributor 23a in feed-water conduit A. The solenoid 25a is shown as connected electrically with electric regulator 26 by means of a branch 27a from circuit 27.

It is to be understood that various changes may be made in the conduct of the method herein described and in the structural organization of the apparatus herein shown and described, without going beyond the bounds of my invention as defined in the appended claims.

I claim as my invention:

1. The herein described method of supplying treating material to boiler water that comprises delivering a measured charge of thick viscous treating material to a foraminous enclosure extending substantially across the full width of a boiler water conduit, maintaining a quantity of the material in the enclosure during a substantial time period, and during the said time period circulating water around and past the exterior of the enclosure and then to a boiler in such manner as to produce a gradual washing of the treating material from the enclosure.

2. The herein described method of supplying treating material to boiler water that comprises periodically delivering successive measured charges of treating material, in suspension, to a foraminous enclosure extending substantially across the full width of a boiler water conduit, retaining material from each charge in the enclosure for a substantial period of time preceding introduction of the succeeding charge, and between and during introductions of the successive charges circulating water around and past the exterior of the enclosure and to a boiler in such manner as to produce a gradual washing of the treating material from the enclosure.

3. The herein described method of supplying treating material to boiler water in a boiler water conduit that comprises periodically delivering measured charges of finely divided treating material in suspension, to a foraminous container extending substantially across the full width of said conduit and during time periods intervening between deliveries of successive charges exposing the said charges to action by said boiler water, to produce a gradual washing of the finely divided material from the charges by continuously flowing boiler water around and past said container.

4. The herein described method of supplying water-treating material to boiler water that comprises forming a measured charge of the material in a thick viscous mass, delivering the charge to a foraminous container where it is restrained against bodily freedom, and distributing the material of the charge in a boiler water conduit by causing boiler water to flow in a confined stream around and past the exterior of said container, said container extending across substantially the full width of the stream to produce a gradual washing of the material from the charge, and periodically renewing said charge while continuously flowing the boiler water in said stream around and past said container.

5. In a water-treating apparatus the combination of a supply line leading from a source of boiler-treating material to a boiler feed water conduit and means for periodically forcing a suspension of boiler-treating material through the supply line, a foraminous treating material dispersing distributor extending substantially across the full width of said boiler feed water conduit and connected with the supply line, the said distributor being arranged to trap a mass of material delivered through the supply line and maintain it partially exposed to washing action by the body of boiler feed water flowing around and past the exterior of the distributor.

6. In a water-treating apparatus the combination of a supply line leading from a source of boiler-treating material to a boiler feed water conduit and means for periodically forcing a suspension of boiler-treating material through the supply line, a foraminous treating material dispersing distributor extending substantially across the full width of said boiler feed water conduit and connected with the supply line, the said distributor being arranged to trap a mass of material delivered through the supply line and maintain it partially exposed to washing action by the body of boiler feed water flowing around and past the exterior of the distributor, said distributor comprising a central perforated tube, a tubular screen surrounding said tube and an outer tube surrounding said screen, said outer tube having openings therein.

7. In a water-treating apparatus the combination of a supply line leading from a source of boiler-treating material to a boiler feed water conduit and means for periodically forcing a suspension of boiler-treating material through the supply line, a foraminous treating material dispersing distributor extending substantially across the full width of said boiler feed water conduit and connected with the supply line, the said distributor being arranged to trap a mass of material delivered through the supply line and maintain it partially exposed to washing action by the body of boiler feed water flowing around and past the exterior of the distributor, said distributor comprising a central perforated tube, a tubular screen surrounding said tube and an outer tube surrounding said screen, said outer tube having openings therein, such openings extending at an angle to the longitudinal axis of said distributor and being of greater area than the perforations in said central tube.

CYRUS WM. RICE.